Feb. 16, 1932.  J. EDGAR  1,844,947
METHOD OF MAKING HOBS
Original Filed May 10, 1926   2 Sheets-Sheet 1
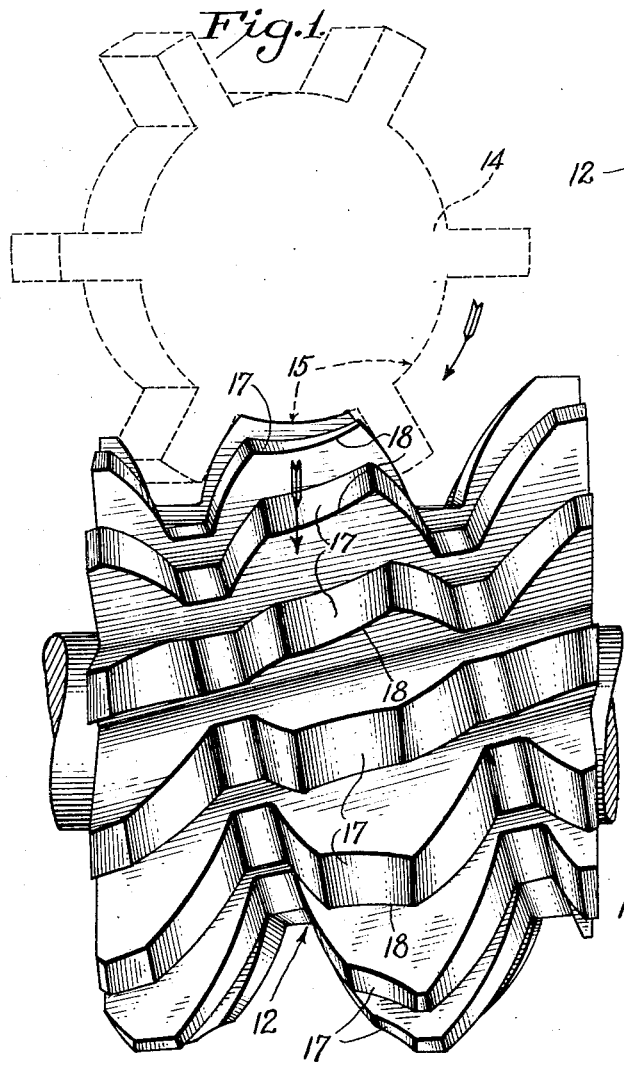
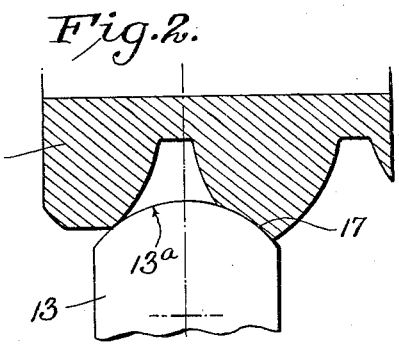
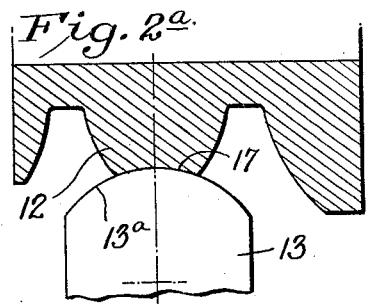
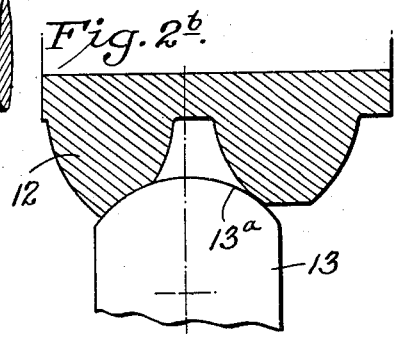
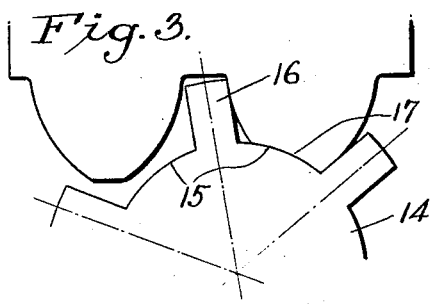
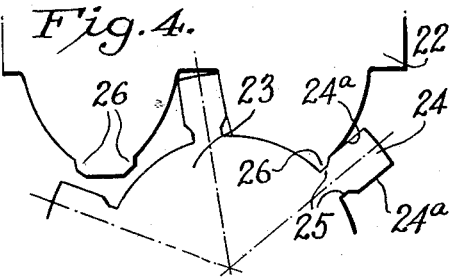
INVENTOR
John Edgar
BY
ATTORNEYS Feb. 16, 1932.  J. EDGAR  1,844,947
METHOD OF MAKING HOBS
Original Filed May 10, 1926  2 Sheets-Sheet 2

INVENTOR
John Edgar
BY
ATTORNEYS

Patented Feb. 16, 1932

1,844,947

UNITED STATES PATENT OFFICE

JOHN EDGAR, OF ROCKFORD, ILLINOIS, ASSIGNOR TO BARBER-COLMAN COMPANY, OF ROCKFORD, ILLINOIS, A CORPORATION OF ILLINOIS

METHOD OF MAKING HOBS

Original application filed May 10, 1926, Serial No. 107,848, Patent No. 1,760,125, dated May 27, 1930. Divided and this application filed September 21, 1929. Serial No. 394,161.

More particularly the invention relates to a method of making hobs for use in the generation of spline shafts, ratchets and other straight-toothed power transmitting devices, this application being a division of my original application Serial No. 107,848 filed on May 10, 1926, now Patent No. 1,760,125, May 27, 1930.

Hobs employed in generating spline shafts, (the term spline shafts being used hereinafter to designate in general the class of toothed power transmitting devices having straight sides) differ from the hobs used in generating spur and similar types of gears. Hobs of the latter type are provided with straight flat sides having the angle of obliquity required on the gear, which, due to the rolling action of the hob in generating the gear, produce the required tooth form on the gear blanks. In order to produce straight sided teeth or keys, such for example as are required on spline shafts, the generated form must be provided on the hob so that when the rolling motion between the hob and blank occurs, the above mentioned action will be reversed and straight sides will be produced on the spline shaft keys. This generated form which must therefore be provided on the hob consists of a curve of constantly changing radii, known in the art as an involute curve.

Heretofore, spline shafts produced by a hobbing process have had certain inherent faults which were due partly to the hob construction. These faults were aggravated by the fundamental principle of the process and were especially noticeable when the key depth was great compared with the width of the keys.

It is the general object of the invention to provide a new method of making a hob of the type required for generating spline shafts, ratchets and other straight toothed power transmitting devices.

Another object of the invention is to provide a method of making a hob for generating spline shafts which have a tooth depth which is relatively great compared with the width of the keys.

Another object of the invention is to provide a method of making a hob which will generate keys having parallel sides of greater depth than is now obtainable and still produce only a minimum radius at the root of the keys.

A still further object of the invention is to provide a method of making a hob which will form more nearly cylindrical sections between the keys than is obtainable with the use of the present type of hob.

Other objects and advantages will become apparent as the description proceeds.

In the drawings:

Figure 1 is a view of a hob made in accordance with the invention, shown in operative relation to a spline shaft.

Figs. 2, 2ª and 2ᵇ illustrate the position of the tool in making the hob of Fig. 1.

Fig. 3 illustrates the hob generating a spline shaft.

Fig. 4 shows a modified form of hob and its relation to the spline shaft section produced thereby.

Figure 5:
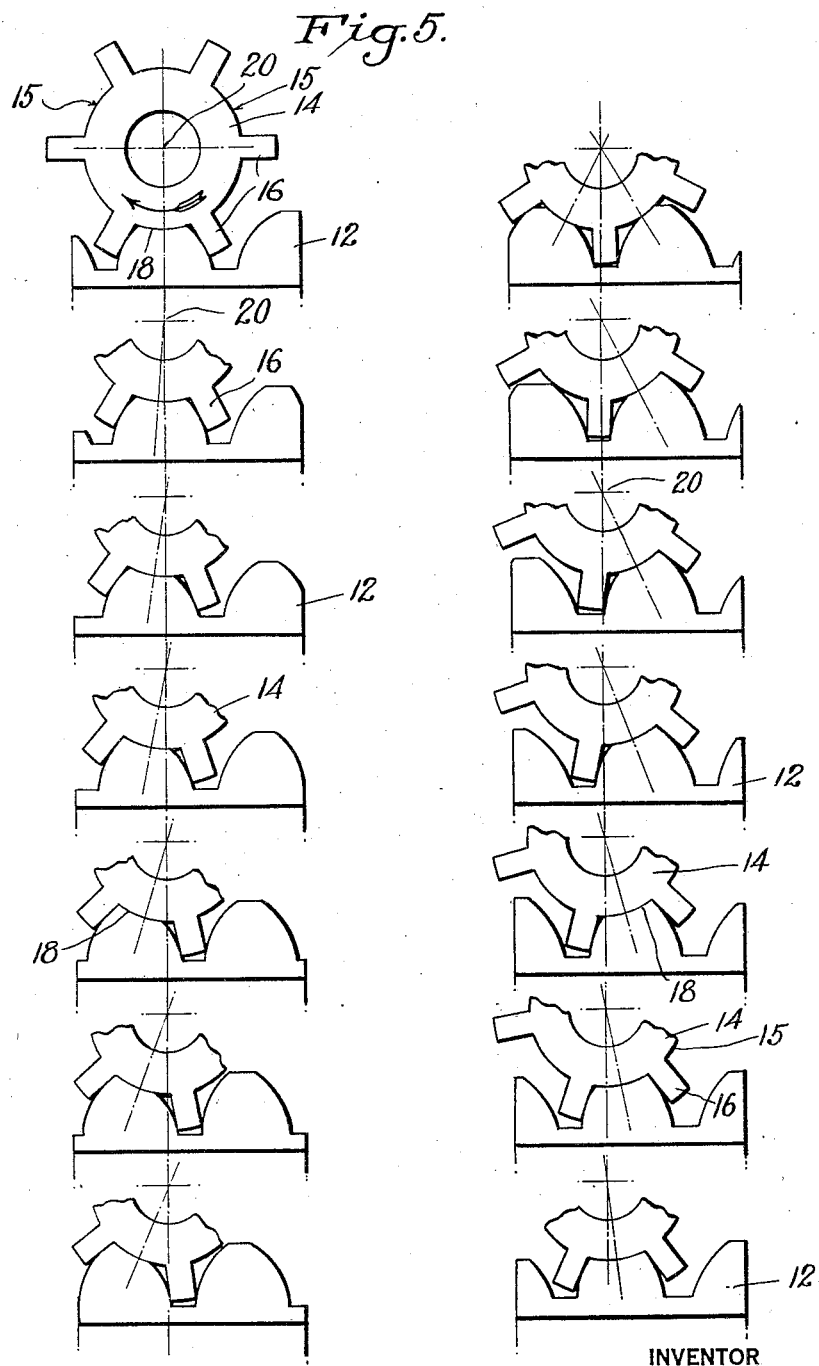
Fig. 5 is a diagrammatic view illustrating step by step, the action of a hob in generating a spline shaft section.

For purposes of illustration, I shall describe the invention as used in connection with the two forms of hob disclosed in said original application, but it is to be understood that I do not intend thereby to limit the invention to the making of such hobs. The scope of the invention will be pointed out in the appended claims.

When standard hobs are used to generate spline shafts, it is difficult to produce a key which has parallel sides throughout its depth, especially when the depth is relatively great compared to the width of the keys. Hob structures have been provided which would produce a key having parallel sides for a greater depth than that obtainable by the use of standard hobs, but to accomplish this a special hob structure was necessary. These were generally of a form which would cut deeper into the blank at the roots of the keys in order that portions between the keys might be maintained, or of a form having elongated or extensively protruding teeth which would cut away the entire cylindrical segment between the teeth.

It is the extreme outward end of the hob tooth which is utilized to form the roots of the keys. When, therefore, the parallel sides of the spline shaft keys are tangent to the curve of the hob tooth at the root of the tooth, then the tooth is in the act of forming this root. Therefore, in order to obtain a key having sides parallel to a predetermined depth, the point of tangency must be brought to that depth.

Since the side cutting edge of the hob teeth form the parallel sides of the key and the tops of the teeth (in for example a hob having elongated teeth) act to cut away the segment between the teeth, it is apparent that it would be advantageous to remove this interfering portion of the hob teeth and mill the desired root section. By the herein described method I provide a hob in which those portions of the hob teeth or thread which extend into the center sections of the shaft between the keys are removed.

I first produce a hob which is standard in all respects except that the tooth depth is greater than necessary to produce a root section of predetermined diameter in order to produce keys having parallel sides extending to the root, and then by an extra relieving operation, form a milling cutter superimposed thereon. That is, I thread, gash and relieve, or back-off a standard hob 12 having elongated teeth. I then employ a form tool 13 to turn off the interfering portion of the thread and thereby form a milling cutter to mill the root section of the spline shaft.

For a spline shaft 14 such as that illustrated in Figs. 1 3 and 5, the form tool 13 has a cutting edge 13$^a$ (Figs. 2, 2$^a$ and 2$^b$) conforming to the desired central section 15 between the keys 16 of the spline shaft, which section is herein illustrated as cylindrical. This form tool has a contour modified to compensate for the helix angle of the hob and is used to cut a peripheral groove 17 in the hob. The groove 17 is circular in contour in a plane parallel to the cutting face of the teeth of the hob and, therefore, is of elliptical contour in an axial plane. During this extra relieving operation for turning off the interfering portion of the teeth, the hob is rotated about its axis and the form tool 13 is fed radially toward the axis of the hob 12 as illustrated in Figs. 2, 2$^a$ and 2$^b$, and has no lateral movement axially with respect to the hob as is the case when relieving the threaded portion.

This extra relieving operation may be carried on by well known means so that cutting edges 18 are produced on the hob.

The angular groove thus cut forms circular depressions of varying depths on the top of the teeth of the hob, the centers of the radii of these circular depressions being identical as illustrated in Figure 5. In use, the hob 12 must be set in relation to the work so that the center 20 of these circular depressions is alined with the axis of the spline shaft 14 as indicated in Figure 5.

Figure 4 illustrates a modified form of hob 22 adapted for use in generating a spline shaft 23 on which it is desired to finish the sides 24$^a$ of the keys 24 by an abrasive operation. As it is difficult to secure a square corner with an abrasive wheel it is necessary that the spline shaft key be under cut at the root as indicated at 25 in order to avoid grinding an objectionable fillet at the tooth root. This is difficult to accomplish through the use of standard hobs because the point of tangency is so near the top of the spline shaft key, i. e., at the top of the fillet formed at the root of the tooth, so that any projection on the hob tooth would destroy the parallel portions of the key. However, in the employment of the modified form of hob shown, the point of tangency occurs at a lower point on the key and the sections removed by the present method include any projections which would be likely to destroy the parallel sides of the key. Therefore, projecting portions 26 are provided on this form of hob to secure the desired undercut, the interfering portions of the thread being removed by the method herein described.

Figure 1 illustrates a hob 12 made in accordance with the invention, in its operative relation to the spline shaft 14. The axis of the spline shaft is inclined to that of the hob to conform to the helix angle of the hob, and is positioned so that the center of the circular depressions 18 in the hob coincide therewith. Fig. 5 illustrates diagrammatically a hob 12 and a spline shaft 14 in progressive angularly disposed positions during the generating of a spline shaft.

I claim as my invention:

1. The method of making a hob for generating straight toothed power transmitting devices, which comprises threading and gashing a blank and relieving the teeth thereon, rotating said blank about its axis and relatively feeding a form tool radially into engagement with said teeth to cut an annular groove therein, said groove having a circular contour in a plane parallel to the face of a tooth.

2. The method of making a hob for generating toothed power transmitting devices, which includes threading, gashing and relieving a blank to form elongated teeth, and cutting in said blank a peripheral groove of elliptical contour.

3. The method of making a hob of the character described which comprises threading and gashing a blank and relieving the teeth thereon, rotating said blank about its axis and relatively feeding a form tool radially into engagement with said teeth to cut grooves therein, said grooves having a contour in a plane parallel to the face of a tooth corresponding to the root section of the toothed device to be formed thereby.

4. The method of making a hob for generating toothed power transmitting devices, which comprises threading and gashing a blank and relieving the teeth thereon, rotating said blank about its axis, and cutting in said blank a peripheral groove having a contour in a plane parallel to the face of a tooth corresponding to the root section of the toothed device to be formed thereby.

In testimony whereof, I have hereunto affixed my signature.

JOHN EDGAR.